United States Patent [19]

Shimazoe et al.

[11] 4,454,771
[45] Jun. 19, 1984

[54] LOAD CELL

[75] Inventors: Michitaka Shimazoe; Yoshitaka Matsuoka, both of Mito, Japan

[73] Assignee: Hitachi, Ltd., Tokyo, Japan

[21] Appl. No.: 318,361

[22] Filed: Nov. 5, 1981

[30] Foreign Application Priority Data

Nov. 7, 1980 [JP] Japan .................. 55-157313

[51] Int. Cl.³ ................................................ G01L 1/18
[52] U.S. Cl. ............................. 73/862.68; 73/862.65; 73/777
[58] Field of Search ........... 73/721, 727, 777, DIG. 4, 73/862.65, 862.68; 338/4, 5

[56] References Cited

U.S. PATENT DOCUMENTS

| | | | |
|---|---|---|---|
| 2,814,946 | 12/1957 | Harris | 73/862.65 |
| 3,204,463 | 9/1965 | Taber | 73/862.65 X |
| 3,213,400 | 10/1965 | Gieb | 73/862.65 X |
| 3,272,006 | 9/1966 | Eckard | 73/862.63 X |
| 3,341,794 | 9/1967 | Stedman | 73/720 X |
| 3,456,226 | 7/1969 | Vick | 338/2 |
| 3,535,923 | 10/1970 | Martorana et al. | 73/862.65 X |
| 3,601,209 | 8/1971 | Paelian | 73/862.65 X |
| 3,958,456 | 5/1976 | Jacobson | 73/862.65 |
| 3,985,025 | 10/1976 | Ormond | 73/862.65 |
| 4,080,830 | 3/1978 | Eckstein et al. | 338/4 X |
| 4,135,408 | 1/1979 | Di Giovanni | 73/721 |
| 4,222,277 | 9/1980 | Kurtz et al. | 73/727 X |
| 4,303,903 | 12/1981 | Matsuoka et al. | 338/4 |
| 4,342,231 | 8/1982 | Yamamoto et al. | 73/721 |
| 4,364,276 | 12/1982 | Shimazoe et al. | 73/721 |

FOREIGN PATENT DOCUMENTS

| | | | |
|---|---|---|---|
| 10204 | 4/1980 | European Pat. Off. | 73/727 |
| 1358231 | 3/1964 | France | 73/862.65 |

OTHER PUBLICATIONS

"Flat load cells", Strainsert, Brochure #365-2, Aug. 1971.
"Flat load cells", Strainsert, Brochure #365-2MP.

Primary Examiner—Gerald Goldberg
Assistant Examiner—Brian Tumm
Attorney, Agent, or Firm—Antonelli, Terry & Wands

[57] ABSTRACT

A load cell comprises a semiconductor diaphragm which includes an outer flange portion, a central rigid portion having a smaller thickness than the outer flange portion and a thin resilient portion provided between the outer flange portion and the central rigid portion. At least two piezo-resistors constituting at least part of a bridge circuit are formed in the resilient portion. The load cell further comprises a first glass block secured to the central rigid portion, and a second glass block for securing the outer flange portion. A load is applied to the semiconductor diaphragm through the first glass block, wherein measurement of the applied load is effected by detecting variation in resistance of the resistor bridge circuit.

15 Claims, 9 Drawing Figures

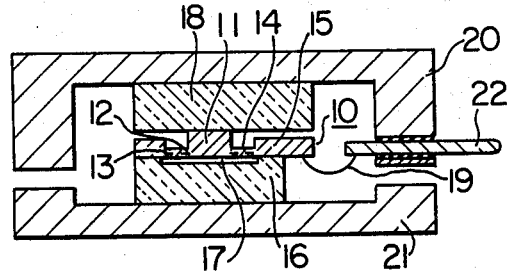

2

LOAD CELL

BACKGROUND OF THE INVENTION

The present invention relates generally to a mechano-electrical converter. In particular, the invention concerns a mechano-electrical converter for converting mechanical loads into electrical signals by using a semiconductor strain gauge.

There have been proposed various mechano-electrical converters for different applications. A load sensor which incorporates a cantilever having a semiconductor strain gauge bonded thereto is used in electronic weghing machines and the like. Further, various pressure sensors are known in which pressure-sensitive semiconductor diaphragms are made use of. A typical one of the pressure-sensitive semiconductor diaphragms is composed of a semiconductor wafer having a central thin portion at which piezo-resistors are integrally formed by doping an impurity of opposite conductivity type to that of the wafer. When the diaphragm is deformed under influence of external pressure applied thereto, the resistance of the piezo-resistor undergoes a corresponding variation, providing a measure of the pressure as applied. With a structure in which the thin portion of the pressure-sensitive diaphragm is covered with a fluidal or deformable material such as silicone oil or silicone rubber, it is possible to measure a load in terms of a variation in pressure. The thin portion or region of the semiconductor diaphragm may be of rectangular, circular or any other suitable configuration and is usually formed with at least two piezo-resistors which are electrically connected in a form of bridge circuit or inserted in arms of the bridge circuit.

In U.S. Pat. No. 4,135,408 issued to Giovanni, there is proposed a silicon diaphragm which is constituted by a silicon wafer having an annular groove defining a thin annular area which serves as a pressure sensitive resilient member. A back plate having a slightly recessed center portion is provided in combination with the silicon diaphragm, wherein a central boss of the diaphragm functions as a limit stop.

In U.S. Pat. No. 4,364,276 assigned to the present assignee, a differential pressure measuring transducer is taught in which a semiconductor diaphragm also having a thin annular area is used, wherein the diaphragm having a central boss area formed thinner than the peripheral support flange is mounted on a flat metal support through an interposed flat glass support.

Further, U.S. Pat. No. 3,456,226 discloses a mechano-electrical transducer of a structure in which a central thin portion of a silicon diaphragm is adapted to be pressed by a post bar. However, this structure which would possibly be destroyed under excessive pressure is not suited for use as the load cell.

On the other hand, in the case of the load cell of the type in which a load to be measured is converted into a pressure which is then actually measured, a conversion error is likely to be involved in the result of the measurement.

Accordingly, an object of the present invention is to provide a semiconductor load converter which assures an improved accuracy of measurement and can enjoy a long use life.

SUMMARY OF THE INVENTION

According to an aspect of the invention, there is proposed a semiconductor load cell which includes a semiconductor diaphragm having a central boss and a peripheral flange coupled with an intermediate resilient portion for receiving a load across two principal surfaces of the semiconductor diaphragm through rigid blocks coupled to the boss and the flange.

According to another aspect of the invention, there is proposed a semiconductor load sensor which includes a semiconductor diaphragm having a first central thick portion, a thin portion extending around the central thick portion and having piezo-resistors formed therein and a second thick portion formed around the thin portion, wherein a load is applied across a first principal surface of the first central thick portion and a principal surface of the second thick portion at the side opposite to the first principal surface.

With the structure described above, the thick portions serve as rigid bodies, whereby an externally applied force wholly acts definitely as a force to deform the thin portion lying between the first and second thick portions. Thus, the measurement of load can be carried out with a high accuracy.

In a preferred embodiment of the invention, the semiconductor diaphragm may include a thick peripheral support flange, a thin annular resilient portion having piezo-resistors formed therein, a central boss area which is slightly thinner than the peripheral support flange, and one common flat principal surface, wherein the peripheral support flange is fixedly secured onto a first glass support, while a second glass support is fixedly mounted on the flat principal surface at a position corresponding to and in opposition to the central boss area. The central boss area is spaced from the first glass support with only a small clearance. Upon application of a load through the second glass support, a corresponding strain is produced in the annular portion, giving rise to a corresponding variation in the resistance values of the piezo-resistors. Under an excessively large load, the central boss will then abut against the first glass support to thereby prevent the resilient portion from being further strained or deformed. Upon removal of the load, the semiconductor diaphragm resumes precisely the initial or original state. Since the central boss and the peripheral flange serve as the rigid bodies which undergo scarcely any deformation under load, the diaphragm can be rigidly and firmly bonded to both glass supports. Thus, the load cell is positively protected from destruction and can enjoy an elongated use life. In other words, there is proposed according to the invention a load cell having a measuring characteristic insusceptible to variations with time and which assures an accurate load measurement over a long period.

BRIEF DESCRIPTION OF THE DRAWINGS

FIG. 3 shows schematically in a sectional view a load cell according to another embodiment of the invention.

FIGS. 4A and 4B show schematically a load cell according to a further embodiment of the invention in a sectional view and a partially broken top plan view, respectively.

FIG. 5 shows schematically in a sectional view a load cell according to still another embodiment of the invention.

FIG. 6 shows schematically in a partially sectional view a hitherto known semiconductor load cell.

DESCRIPTION OF THE PREFERRED EMBODIMENTS

Figure 1A:
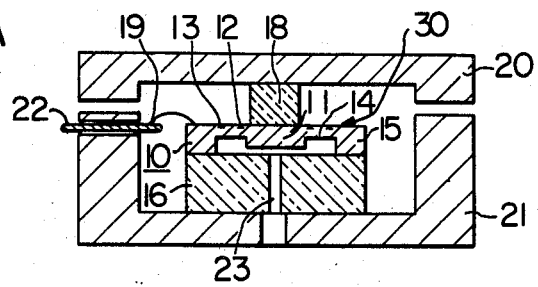
FIG. 1A shows schematically in a sectional view a load cell according to an exemplary embodiment of the invention.

Before entering into description of the present invention, a typical one of the hitherto known load cells will be elucidated by referring to FIG. 6. As can be seen from this figure, the conventional load cell comprises an n-type silicon diaphragm 2 disposed on a support base 1. A recessed portion 3 is formed in the lower surface of the silicon diaphragm 2 at a center portion thereof in which p-type piezo-resistors 4 are formed at an area of a reduced thickness. Lead wires (not shown) attached to the piezo-resistors 4 are led out through a hole 5 to the exterior. A stylus 6 is disposed above the diaphragm 2 at the center portion thereof for applying a load thereto. When the diaphragm 2 is pressed downwardly through the stylus 6, the thin area of the diaphragm 2 is deformed downwardly, bringing about a variation in the resistance of the piezo-resistors 4. The magnitude of the applied load can thus be acquired by measuring the variation in resistance of the piezo-resistors 4. Although the load sensor is of a simple structure, the sensor is likely to be injured or destroyed under an excessively large load or after repetitive uses in view of the fact that the thin area of the silicon diaphragm is pressed by the rigid stylus. Besides, when the central resilient area is formed very thin with a view of attaining a high sensitivity, a membrane stress is produced to degrade the accuracy of measurement. In this connection, it is conceivable that the top surface is covered with a silicon rubber, silicone oil or the like so that the load is applied through the interposed load transmitting medium. However, such an arrangement will degrade the measuring accuracy due to the presence of the interposed medium, not to speak of a complicated structure. Further, the intermediate medium may become hardened through long use period and the diaphragm is constantly subjected to a force, as the result of which not only the use life is reduced but also the accuracy of measurement is degraded.

With the invention, it is contemplated to provide a load cell which is immune to the drawbacks of the conventional cell described above.

Figure 1B:
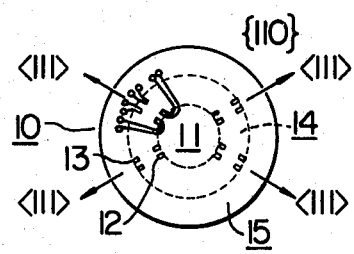
FIG. 1B shows schematically in a top plan view a semiconductor diaphragm used in the load cell shown in FIG. 1A.
Figure 2A:
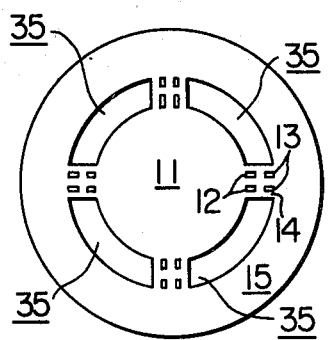
FIGS. 2A and 2B show schematically in top plan views other semiconductor diaphragms which may be incorporated in the load cell shown in FIG. 1A.
Figure 2B:
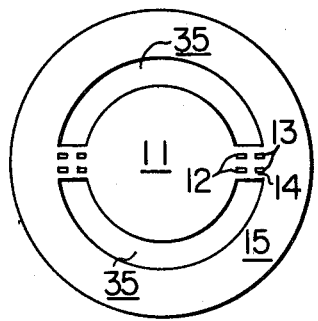

Now, the invention will be described by referring to FIG. 1A which shows a load cell according to an embodiment of the invention. A silicon diaphragm 10 is formed of an n-type single crystal silicon wafer having a flat principal surface 30 which includes a central thick boss 11, a thin resilient region or area 14 extending around the outer periphery of the boss 11 and a flange portion 15 having a thickness greater than that of the boss 11 and extending around the outer periphery of the region or area 14. A schematic top plan view of the silicon diaphragm is shown in FIG. 1B. The principal surface 30 of the silicon wafer 10 extends in {110}-plane. The p-type gauge resistors 12 and 13 extending in <111>-direction in the resilient region 14. Although four groups each comprising four piezo-resistors are illustrated as provided, only one group of the piezo-resistors is used for forming a bridge circuit. Details of the silicon diaphragm 10 shown in FIG. 1B are disclosed in the above cited U.S. Pat. No. 4,364,276. The semiconductor diaphragm 10 may also be formed of a {100}-silicon wafer having the gauge resistors extending in the <110>-direction. The diaphragm 10 may be realized in various shapes and sizes in dependence of particular applications through appropriate machining or etching processes. By way of example, the diaphragm 10 may be machined in a diameter of about 4.5 mm, the flange 15 being about 300 μm in thickness, the boss 11 being about 280 μm thick, the resilient region 14 subjected to strain being about 50 μm thick and about 0.5 mm wide. The inner diameter of the annular thin resilient region 14 is preferably selected about 70% or more of the outer diameter thereof. The dimension of the resilient region or area 14 may be selected in accordance with a range of loads to be measured. It is not necessary that the diaphragm 10 physically separate or isolate the spaces accrued at both sides thereof. Accordingly, the resilient area or region 14 need not necessarily be so provided as to extend wholly around the outer periphery of the boss 11 but may extend partially around the outer periphery of the central boss 11, as is illustrated in FIGS. 2A and 2B. More particularly, in the case of the diaphragm shown in FIG. 2A, the central boss 11 and the peripheral flange 15 are coupled to each other through four resilient areas 14. In the diaphragm shown in FIG. 2B, the central boss 11 is coupled to the peripheral flange 15 through two resilient areas or regions 14. Because of the presence of through-hole or notched portions 35, the area of the resilient region 14 of the diaphragms shown in FIGS. 2A and 2B is correspondingly reduced, whereby a significantly increased strain is produced for a given load. Thus, a high sensitivity can be attained without reducing excessively the thickness of the resilient region 14. In this connection, it should be noted that the membrane having one or more such through-hole or notched portions formed therein is herein referred to also as the diaphragm. The diaphragm is formed of a single semiconductor body or wafer.

Referring again to FIG. 1A, the semiconductor diaphragm 10 is positioned on a rigid block 16 formed of boro-silicate glass such as Pyrex available from Corning Glass Works and having a central bore 23 in such a disposition that the principal surface of the diaphragm 10 on which the piezo-resistors 12, 13 are formed faces upwardly, as viewed in FIG. 1A. The glass block 16 has an outer diameter substantially equal to that of the diaphragm 10 and presents a flat end face. The boss 11 of the diaphragm 10 is spaced from the top surface of the block 16 only by a small distance which is equal to the difference in thickness between the boss portion 1 and the peripheral portion 15 and which allows the diaphragm to be flexed. The flange 15 of the diaphragm 10 is fixed to the top surface of the glass block 16, for example, by anodic bonding. When a silicon diaphragm is used, the block 16 should desirably have a thermal expansion coefficient which is substantially equal to that of the diaphragm. As a material which meets this requirement, there are available, for example, silicon and boro-silicate glass. The space underlying the diaphragm 10 is communicated with the exterior by way of the through-hole 23 formed in the glass block 16. It will be seen from FIG. 1 that another rigid block 18 is disposed on the flat principal surface 30 of the diaphragm 10 at a position opposite to the boss 11. The block 18 is preferably be formed of silicon or boro-silicate glass as in the case of the block 16. The assembly thus obtained is fixedly placed in a lower casing 21. Subsequently, terminals 22 and lead wires 19 are connected to the terminals of the piezo-resistor bridge of the semiconductor diaphragm 10. A through-hole is formed in the bottom of the lower case 21 in alignment with the through-hole 23 formed in the block 16, whereby the spaced defined below the diaphragm 10 is communicated with the exterior and maintained at the atmospheric pressure. An upper casing 20 is secured to the upper block 18. The upper and the lower casings 20 and 21 may be formed of a metal such as stainless steel and iron-nickel-cobalt alloy such as Kovar available from Westinghouse Electric Corp. or ceramic and a plastic material such as epoxy resin or the like. A layer of a soft material or a bellows (not shown) may be interposed between the upper and lower casings 20 and 21 to thereby seal the interior space defined by these casings. When a load is applied onto the load cell from above, all the load acts as a force to strain or flex the resilient region or area 14 of the semiconductor diaphragm 10, resulting in a corresponding output signal from the output terminals of the piezo-resistor bridge. Upon application of an excessively large load, the central boss 11 bears against the glass block 16, whereby the thin resilient region 14 is prevented from being further deformed beyond a predetermined level and thus protected from damage or destruction. It goes without saying that the load cell can be used in the inverted position. Although it has been assumed in the foregoing that the four piezo-resistors are formed in the diaphragm 10 at the thin resilient region 14, for example, through thermal diffusion process in each resistor group in a bridge configuration, it will be self-explanatory that some resistor(s) of the bridge may be replaced by variable and/or fixed resistor(s) provided externally. In addition to the bridge, de-amplifier circuit and the like may be implemented in the diaphragm 10.

FIG. 3 is a sectional view to illustrate another embodiment of the invention. In the figure, similar parts as those shown in FIGS. 1A, 1B, 2A and 2B are denoted by similar reference numerals. Referring to FIG. 3, the semiconductor diaphragm 10 formed of single crystal silicon includes a first thick portion 11 at a central portion, a thin portion 14 extending around the central thick portion 11, and a second thick portion 15 extending around the thin portion 14. The thickness of the second thick portion 15 is slightly smaller than that of the first thick portion 11. There are integrally formed in predetermined regions of the thin portion 14 piezo-resistor elements 12 and 13 through a thermal diffusion or ion implantation process. In the case of the embodiment shown in FIG. 3, the diaphragm 10 is disposed on a glass support 16 with a flat principal surface of the diaphragm facing downward. The first and the second thick portions 11 and 15 serve substantially as the rigid body with only the thin portion 14 being subjected to deformation. The glass support 16 has a shallow recess 17 formed in the top surface at a center portion, which recess 17 allows the diaphragm to be deformed and simultaneously serves to seal the piezo-resistor elements 12 and 13. The glass plate 16 is coupled to the flat primary surface of the semiconductor diaphragm 10 at the second thick portion 15 through anodic (electrostatic) bonding process, whereby a cavity is hermetically formed by the recess 17 immediately below the piezo-resistor elements 12 and 13. This cavity is evacuated for the purpose of protecting the semiconductor surface having the piezo-resistors 12 and 13 formed therein and making it possible to measure the absolute pressure. The glass support 16 is implemented with a smaller diameter than that of the diaphragm 10 to thereby allow the connection wires 19 to be led outwardly. An upper glass plate 18 is bonded to the first thick portion 11 of the semiconductor diaphragm 10 through anodic bonding process. As described above, the first thick portion 11 is thicker than the second thick portion 15 so that the top surface of the first thick portion 11 lies above the plane of the top surface of the second thick portion 15. Thus, the flat glass plate 18 can be easily bonded only to the top surface of the first thick portion 11.

An upper casing 20 is bonded to the glass plate. The lead wires 19 are connected to feed-through terminals 22. A lower casing 21 is bonded to the bottom of the glass block 16. The load cell is thus accomplished.

In operation of the load cell shown in FIG. 3, a load applied across the upper and the lower casings 20 and 21 make appearance as a force applied across the top surface of the first thick portion 11 of the semiconductor diaphragm 10 and the bottom surface of the second thick portion 15. In this way, the applied load wholly acts as the force to deform the thin portion 14 of the diaphragm 10, whereby the load can be detected with a high accuracy as the corresponding variation in resistance value of the piezo-resistor elements 12 and 13. As can be seen from FIG. 3, the glass plate 18 is adapted to eventually bear against the first thick portion 11 while being maintained spaced from the second thick portion 15 by a predetermined distance. With such arrangement, the glass plate 18 is caused to abut also on the top surface of the second thick portion 15 upon application of an excessively large load, wehreby the thin portion 14 is prevented from being subjected to an excessive deformation or strain and hence protected from destruction even under the undesirable conditions mentioned above. It is obvious that many modifications of the embodiment shown in FIG. 3 will readily occur to those skilled in the art as in the case of the load cell described hereinabove in conjunction with FIGS. 1A and 1B.

FIGS. 4A and 4B show a load cell according to another embodiment of the invention in which a load measuring range can be changed by using a casing of a unique structure. FIG. 4A shows schematically the load cell in a vertical section, while FIG. 4B shows the same schematically in a top plan view. It will be seen that the semiconductor diaphragm 10, the upper and the lower support blocks 18 and 16 and the lower casing 21 are implemented substantially identical with those of the load cell shown in FIG. 1A.

In the case of the load cell shown in FIGS. 4A and 4B, the upper casing 20 is bonded to the lower casing 21, wherein a rigid body portion 24 for transmitting a load to the interposed glass plate 18 and a flexible portion 25 for resiliently supporting the rigid portion 24 are formed in the upper casing 20. The load is transmitted to the semiconductor diaphragm 10 through the lower casing 21 and the rigid portion 24 of the upper casing 20 through the rigid blocks 16 and 18, respectively. The flexible portion 25 serves to maintain constantly the rigid portion 24 at a predetermined position and is also effective to apply the load to be measured in the direction perpendicular to the semiconductor diaphragm 10. Besides, by varying a force constant of the flexible portion 25, for example, by varying correspondingly the thickness of the flexible portion, there can be realized a load cell which is capable of measuring loads over an extensive load range from light to heavy loads by using a semiconductor diaphragm of a same rate. As shown in FIGS. 4A and 4B, the portion of the casing 20 bonded to the casing 21 is of annular shape and forms a fixed support with the flexible portion 25 forming a seal between the rigid portion 24 and the support.

FIG. 5 shows a load cell according to still another embodiment of the invention which is suited for measurement of relatively light loads. Referring to this figure, an electrically conductive thick film 27 are fixedly deposited on a ceramic substrate 26, wherein the thick film 27 is fixedly coupled to the semiconductor diaphragm 10 at the thick portion 15 thereof by means of solder balls 28 which can serve for electric connection between the piezo-resistor elements 12, 13 and the thick film 27, to simplify the wiring arrangement.

In the foregoing, the invention has been described in conjunction with several preferred embodiments thereof. However, it will be readily appreciated that various alterations and modifications can be made without departing from the spirit and scope of the invention. For example, the semiconductor diaphragm as well as the upper and lower casings may be imparted with various shapes. Further, semiconductor bodies incorporating semiconductor piezo-resistors other than n-type silicon wafer having p-type piezo-resistors may equally be used. It goes without saying that the surface of the semiconductor diaphragm may be covered with a fluidal material such as silicone gel for protecting the piezo-resistors.

We claim:

1. A semiconductor mechano-electrical converter comprising: a semiconductor diaphragm having first and second principal surfaces, one of said first and second principal surfaces being substantially flat, said semiconductor diaphragm including a first thick portion, a thin portion disposed at least partially around an outer periphery of said first thick portion and having at least two piezo-resistors formed therein to constitute at least part of a bridge circuit, and a second thick portion disposed around an outer pheriphery of said thin portion; and load applying means for applying a load selectively across one of said first and second principal surfaces at said first thick portion and across the other of said first and second principal surfaces at said second thick portion, said load applying means including a first block secured to said first thick portion and a second block secured to said second thick portion, said first and second blocks being formed of one material selected from a group consisting of boro-silicate glass and silicon, and said semiconductor diaphragm being formed of an n-type silicon wafer incorporating said piezo-resistors of a p-conductivity type.

2. A semiconductor mechano-electric converter according to claim 1, wherein said first thick portion has a thickness different from that of said second thick portion.

3. A semiconductor mechano-electrical converter according to claim 1 or 2, wherein said load applying means further comprises a rigid body means including said first block, a fixed support, and a flexible member for resiliently coupling said rigid body means to said first support.

4. A semiconductor mechano-electrical converter according to claim 3, wherein said support is of an annular form, said rigid body means includes first and second rigid portions, and said flexible member serves to form a seal between at least said first rigid portion and said support.

5. A semiconductor mechano-electrical converter according to claim 1, wherein said thin portion includes a plurality of spaced members interconnecting predetermined areas of the outer periphery of said first thick portion to predetermined areas of said second thick portion, said piezo-resistors being formed in said substantially flat principal surface.

6. A semiconductor mechano-electrical converter according to claim 1, wherein said thin portion is disposed completely around the outer periphery of said first thick portion and said second thick portion is disposed completely around the outer periphery of said thin portion, said piezo-resistors being formed in said substantially flat principal surface.

7. A semiconductor mechano-electrical converter according to claim 1, wherein said second principal surface has a recess formed therein, said first thick portion has a smaller thickness than said second thick portion, and said second block has a flat top surface which is secured to said second principal surface of the semiconductor diaphragm at said second thick portion.

8. A semiconductor mechano-electrical converter according to claim 1, wherein said second principal surface has a recess formed therein, said first thick portion has a greater thickness than said second thick portion, and said first block has a flat bottom surface secured to said second principal surface of the semiconductor diaphragm at said first thick portion.

9. A semiconductor mechano-electrical converter according to claim 8, wherein said second block has a top surface having a recess formed therein at a central portion thereof, said top surface of the second block and said first principal surface of the semiconductor diaphragm of said second thick portion being hermetically sealed.

10. A semiconductor mechano-electrical converter according to claim 1, wherein said diaphragm has notched portions formed between said first and second thick portions.

11. A semiconductor mechano-electrical converter according to claim 1, further comprising a case accommodating said semiconductor diaphragm and said first and second blocks in such a manner that relative movement is allowed between said first and second blocks.

12. A semiconductor mechano-electrical converter according to claim 2, wherein the one of said first and second blocks secured to the thicker one of said first and second thick portions is spaced from the other of said first and second thick portions by a distance corresponding to the difference in thickness.

13. A load cell comprising:
an n-type silicon wafer semiconductor diaphragm including a thick central portion having a first flat surface, a second thick flange portion disposed to enclose said central portion and having a second flat surface at the side opposite to said first flat surface, and a thin resilient portion for connecting said central portion and said flange portion to each other and having p-conductivity type piezo-resistor elements formed therein;
a first rigid body secured to said first surface of said central portion;
a second rigid body secured to said second surface of said flange portion, said first and second rigid bodies being formed of one material selected from the group consisting of boro-silicate glass and silicon; and a case accommodating said semiconductor diaphragm, and said first and second rigid bodies in such a manner that a relative movement is allowed between said first and second rigid bodies.

14. A load cell according to claim 13, wherein said central portion and said flange portion have respective thicknesses which differ slightly from each other, the rigid body secured to the thicker one of said central portion and said flange portion being spaced from the other of said central portion and said flange portion by a distance corresponding to said difference in thickness.

15. A load cell according to claim 13 or 14, wherein said resilient portion connects only predetermined areas of said central portion to predetermined areas of said flange portion.

* * * * *